July 1, 1958 R. M. HUBBARD 2,841,656

TEMPERATURE COMPENSATED MAGNETIC AMPLIFIER

Filed Sept. 13, 1957

INVENTOR.
ROBERT M. HUBBARD

BY K. W. Thomas

ATTORNEY 2,841,656
Patented July 1, 1958

2,841,656

TEMPERATURE COMPENSATED MAGNETIC AMPLIFIER

Robert M. Hubbard, Seattle, Wash., assignor to Boeing Airplane Company, Seattle, Wash., a corporation of Delaware Application September 13, 1957, Serial No. 683,775

4 Claims. (Cl. 179—171)

Figures 1, 2:
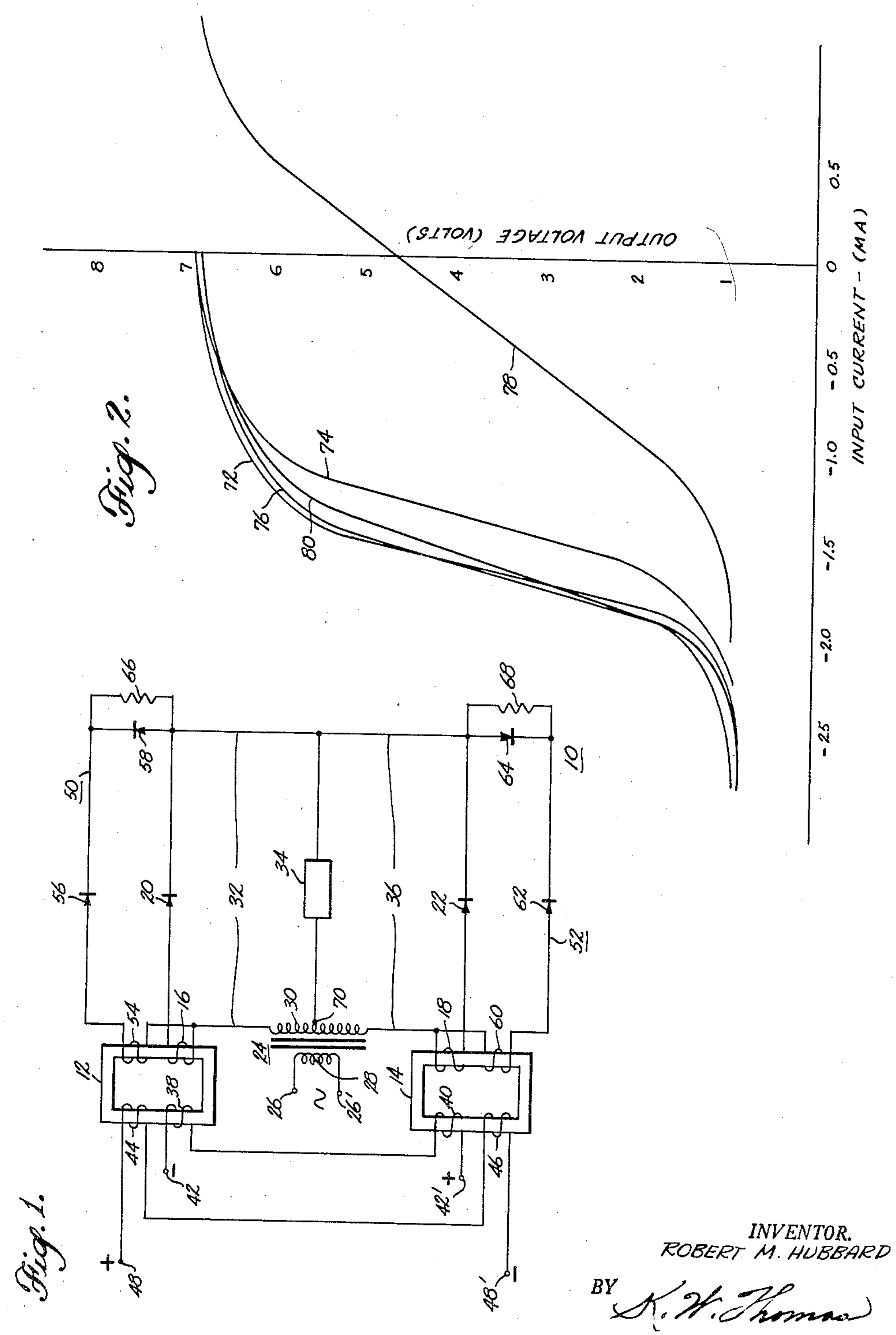

This invention relates to magnetic amplifiers and more particularly to means for compensating self-saturating magnetic amplifiers for changes in the ambient temperature of the air surrounding the magnetic amplifier.

The leakage current of self-saturating rectifiers incorporated in a magnetic amplifier varies in accordance with the ambient temperature of the air surrounding the magnetic amplifier. In particular, this leakage current increases non-linearly with an increase in the ambient temperature of the air. Therefore, the gain of the magnetic amplifier decreases with an increase in the temperature of the air surrounding the magnetic amplifier. Further, since the leakage or demagnetizing current varies in accordance with the temperature of the air surrounding the magnetic amplifier the output voltage of the magnetic amplifier also varies with changes in the temperature of the air even though the magnitude of the control input signal remains constant. Therefore, the magnitude of the output voltage of the amplifier, with changes in the temperature of the air, does not truly reflect the magnitude of the control signal.

Heretofore, in order to alleviate the above mentioned difficulties each of the self-saturating rectifiers of the magnetic amplifier were shunted with a resistor so that the diode leakage at the elevated temperature became negligible compared to the current flow through the shunt path provided by the resistor. Thus, by introducing a leakage path which was substantially insensitive to temperature, the circuit was made tolerant of relatively high temperatures. Unfortunately, this method involves drastic deterioration of room temperature performance just to achieve temperature stability. In addition, even with the best presently available high temperature self-saturating rectifiers at 250° C., for example, the diode leakage is of such magnitude that it makes it completely impractical to consider this prior art shunting method as a means of improving temperature stability.

An alternate prior art approach to the problem has been to attempt to compensate the effect of diode leakage on the magnetic amplifier performance rather than to compensate the leakage directly. Thus, temperature sensitive elements have been added to bias and feed back circuits to counteract the effects of leakage. However, since diode leakage is an extremely non-linear function of temperature the matching of a non-linear compensating circuit to the non-linearity of the self-saturating rectifier has proven to be impractical at relatively high temperatures of the order of 200° C.

An object of this invention is to provide in a self-saturating magnetic amplifier for compensating for the leakage of the self-saturating rectifier or rectifiers over a wide ambient temperature range of the air surrounding the magnetic amplifier, to thus obtain over the wide ambient temperature range a maximum of amplifier gain and an output voltage the magnitude of which is substantially independent of the leakage of the self-saturating rectifier or rectifiers.

A more specific object of this invention is to provide for maximizing the gain of a self-saturating magnetic amplifier and for rendering the magnitude of the output voltage of the amplifier substantially independent of the leakage of the self-saturating rectifier incorporated therein over a wide ambient temperature range of the air surrounding the amplifier, by compensating the self-saturating rectifier with a similar non-linear element.

Another specific object of this invention is to provide for effecting a flow of compensating current through a compensating winding of a magnetic amplifier whose magnitude varies substantially in accordance with the magnitude of the demagnetizing current flow through the load winding over a wide ambient temperature range of the air surrounding the amplifier to thus effect compensating ampere-turns which substantially offset the demagnetizing ampere-turns and thereby obtain over the wide ambient temperature range a maximum of amplifier gain and an output voltage the magnitude of which is substantially independent of the magnitude of the demagnetizing current.

Other objects of this invention will become apparent from the following description when taken in conjunction with the accompanying drawing in which:

Fig. 1 is a schematic diagram of circuits and apparatus embodying the teachings of this invention, and Fig. 2 is a graph illustrating the effect on the transfer characteristic curve of a magnetic amplifier when the ambient temperature of the air surrounding the magnetic amplifier changes, this condition being illustrated when compensating means in accordance with this invention is provided and when no compensating means is provided.

Referring to Fig. 1 there is illustrated a center-tapped self-saturating magnetic amplifier 10 embodying the teachings of this invention. As illustrated, the magnetic amplifier 10 includes magnetic core means, specifically two magnetic core members 12 and 14 which are preferably constructed of a material having a rectangular loop hysteresis characteristic. Load windings 16 and 18 are disposed in inductive relationship with the magnetic core members 12 and 14, respectively. In order to produce self-saturation for the magnetic amplifier 10 and, more particularly, to permit the flow of current in only one direction through the load windings 16 and 18 self-saturating rectifiers 20 and 22 are connected in series circuit relationship with the respective load windings 16 and 18.

The current for the load windings 16 and 18 is derived from a center-tapped transformer 24 which is connected to input terminals 26 and 26′ which have connected thereto a suitable source (not shown) of alternating supply voltage. In this instance, the center-tapped transformer 24 comprises a primary winding 28 which is connected to the input terminals 26 and 26′ and a center-tapped secondary winding 30.

In order to alternately effect a flow of load current through the series circuit including the load winding 16 and the self-saturating rectifier 20 and the series circuit including the load winding 18 and the self-saturating rectifier 22, circuit means 32 including a load 34 is provided for connecting the series circuit including the load winding 16 and the self-saturating rectifier 20 to the secondary winding 30 of the transformer 24, and circuit means 36 including the load 34 is provided for connecting the series circuit including the load winding 18 and the self-saturating rectifier 22 to the secondary winding 30, of the transformer 24. Of course, the circuit means 32 and 36 permit leakage or demagnetizing current to alternately flow through the load windings 16 and 18.

For the purpose of biasing the magnetic core members 12 and 14 a predetermined amount bias windings 38 and 40 are disposed in inductive relationship with the respective magnetic core members 12 and 14. In particular, the bias windings 38 and 40 are connected in series circuit relationship with one another, the series circuit being connected to terminals 42 and 42' to which is connected a source (not shown) of direct-current bias voltage. In practice, the bias source (not shown) is so connected to the terminals 42 and 42' that the current flow through the bias windings 38 and 40 produces magnetomotive forces which oppose the magnetomotive forces produced by the load current flow through the respective load windings 16 and 18.

The flux level in the magnetic core members 12 and 14, and thus the magnitude of the voltage across the load 34, is controlled by control windings 44 and 46 which are disposed in inductive relationship with magnetic core members 12 and 14, respectively. As illustrated, the control windings 44 and 46 are connected in series circuit relationship with one another, the series circuit being connected to control terminals 48 and 48' to which a source (not shown) of direct-current control voltage is applied. With the polarity of the control voltage as shown the current flow through the control windings 44 and 46 effects magnetomotive forces which oppose the magnetomotive forces produced by the current flow through the associated bias windings 38 and 40, respectively. The circuit and apparatus so far described is a standard center-tapped self-saturating magnetic amplifier.

In accordance with the teachings of this invention in order to compensate for the leakage of the self-saturating rectifiers 20 and 22 over a wide ambient temperature range of the air surrounding the magnetic amplifier 10, compensating circuits 50 and 52 are provided. The compensating circuit 50 is a series circuit which includes a compensating winding 54, which is disposed in inductive relationship with the magnetic core member 12, a unilateral conducting member, specifically a compensating rectifier 56, and a unilateral conducting member, specifically a blocking rectifier 58. As illustrated, the compensating circuit 50 is connected in parallel circuit relationship with the series circuit including the load winding 16 and the self-saturating rectifier 20. In practice, the compensating winding 54 is so disposed on the magnetic core member 12 that when compensating current or leakage current flows therethrough the magnetomotive force produced opposes the magnetomotive force produced by the leakage or demagnetizing current through the load winding 16. Further, the compensating rectifier 56 is poled in the same direction as the self-saturating rectifier 20, the blocking rectifier 58 being connected to prevent the flow of current through the compensating winding 54 when load current is flowing through the load winding 16 and the self-saturating rectifier 20.

On the other hand, the compensating circuit 52 is a series circuit which includes a compensating winding 60, which is disposed in inductive relationship with the magnetic core member 14, a unilateral conducting member, specifically a compensating rectifier 62, and a unilateral conducting member, specifically a blocking rectifier 64. In practice, the compensating winding 60 is so disposed on the magnetic core member 14 that when compensating current flows through the compensating winding 60 a magnetomotive force is produced which opposes the magnetomotive force produced by the leakage or demagnetizing current flowing through the load winding 18. As illustrated, the compensating rectifier 62 and the self-saturating rectifier 22 are poled in the same direction and the blocking rectifier 64 is connected to prevent the flow of current through the compensating winding 60 when load current is flowing through the load winding 18 and the self-saturating rectifier 22.

It is to be noted if the blocking rectifiers 58 and 64 were not provided there would be no flux change in the magnetic core members 12 and 14 and thus substantially all of the voltage would appear across the load 34. In other words, if these blocking rectifiers 58 and 64 were not provided the magnitude of the voltage across the load 34 could not be varied by means of the control circuit including the control windings 44 and 46.

In practice, the compensating winding 54 and the load winding 16 should preferably have the same number of turns. In like manner, the compensating winding 60 and the load winding 18 should preferably have the same number of turns. Further, the self-saturating rectifier 20 and the compensating rectifier 56, and the self-saturating rectifier 22 and the compensating rectifier 62, should preferably have substantially the same reverse impedance-temperature characteristic and should preferably be of the same general type. Also, in order to obtain optimum performance it is desirable that the rectifiers 20, 22, 56 and 62 be subjected to air of substantially the same ambient temperature.

In order to permit the compensating rectifiers 56 and 62 to conduct a small amount of forward current, resistors 66 and 68 are connected in parallel circuit relationship with the respective blocking rectifiers 58 and 64. This permits the compensating rectifiers 56 and 62 to assume a characteristic which is more like the characteristic of the associated self-saturating rectifiers 20 and 22.

The operation of the magnetic amplifier 10 will now be described. Assuming the polarity of the supply voltage applied to the input terminals 26 and 26' is such that the upper end of the secondary winding 30, as shown, is at a positive polarity then current flows from the upper end of the secondary winding 30 through the load winding 16, the self-saturating rectifier 20, and the load 34, to the center tap 70 of the secondary winding 30. During this same half-cycle of operation a small amount of current flows from the upper end of the secondary winding 30, as shown, through the compensating winding 54, the compensating rectifier 56, the resistor 66, and the load 34, to the center tap 70, of the secondary winding 30. Simultaneously, during this same half-cycle of operation, leakage or demagnetizing current flows from the center tap 70 through the load 34, the self-saturating rectifier 22, and the load winding 18, to the lower end of the secondary winding 30, as shown. Also, during this half-cycle of operation compensating current flows from the center tap 70, of the secondary winding 30, through the load 34, the blocking rectifier 64, the compensating rectifier 62, and the compensating winding 60, to the lower end of the secondary winding 30, as shown. During this half-cycle of operation the ampere-turns of the compensating winding 60 just offset the ampere-turns of the load winding 18 and therefore the hereinbefore mentioned undesirable effect produced by leakage current flowing through the self-saturating rectifier 22 is substantially eliminated irrespective of the magnitude of the ambient temperature of the air surrounding the magnetic amplifier 10.

During the next half-cycle of operation, when the lower end of the secondary winding 30, as shown, is at a positive polarity, load current flows from the lower end of a secondary winding 30 through the load winding 18, the self-saturating rectifier 22, and the load 34, to the center tap 70, of the secondary winding 30. Simultaneously, a small amount of current also flows from the lower end of the secondary winding 30, as shown, through the compensating winding 60, the compensating rectifier 62, the resistor 68, and the load 34, to the center tap 70, of the secondary winding 30. During this same half-cycle of operation leakage or demagnetizing current flows from the center tap 70, of the secondary winding 30, through the load 34, the self-saturating rectifier 20, and the load winding 16, to the upper end of the secondary winding 30, as shown. At the same time compensating current flows from the center tap 70, of the secondary winding 30, through the load 34, the blocking rectifier 58, the compensating rectifier 56, and the compensating winding 54, to the upper end of the secondary winding 30, as shown. The ampere-turns produced by the flow of compensating current through the compensating winding 54 just offsets the ampere-turns produced by the flow of leakage or demagnetizing current through the load winding 16. Therefore, the hereinbefore mentioned undesirable effect produced by leakage current flowing through the self-saturating rectifier 20 is substantially eliminated irrespective of the magnitude of the ambient temperature of the air surrounding the magnetic amplifier 10.

Referring to Fig. 2 there is illustrated a plurality of static transfer characteristic curves for a magnetic amplifier compensated in accordance with this invention and for a magnetic amplifier which is not so compensated. A curve 72 represents the static transfer characteristic curve of a standard uncompensated magnetic amplifier operating at 25° C. On the other hand, a curve 74 represents the static transfer characteristic curve for the same uncompensated magnetic amplifier operating at 250° C. However, when this magnetic amplifier is compensated in accordance with the teachings of this invention a curve 76 represents the static transfer characteristic for the magnetic amplifier. When the temperature of the air surrounding the magnetic amplifier is increased to 300° C. the static transfer characteristic curve for the uncompensated magnetic amplifier is as represented at 78. However, when this magnetic amplifier is temperature compensated in accordance with the teachings of this invention the static transfer characteristic curve is as represented at 80. Thus, as can be seen from the curves of Fig. 2 when the magnetic amplifier is temperature compensated in accordance with the teachings of this invention the decrease in the gain of the magnetic amplifier due to the leakage of the self-saturating rectifiers is minimized. Further, as can be seen from these curves of Fig. 2 when the magnetic amplifier is temperature compensated in accordance with the teachings of this invention the magnitude of the output voltage of the magnetic amplifier, over a wide ambient temperature range, is not substantially changed due to the leakage of the self-saturating rectifiers.

The apparatus embodying the teachings of this invention has several advantages. For instance, it is not necessary to substantially decrease the gain of the magnetic amplifier in order to obtain the desired temperature compensation. Further, there is obtained an output voltage for the magnetic amplifier which is substantially independent of the magnitude of the ambient temperature of the surrounding air. Since this is true the possible usage of the magnetic amplifier is greatly extended.

Since certain changes may be made in the above described apparatus and circuits and different embodiments of the invention may be made without departing from the spirit and scope thereof, it is intended that all matter contained in the above description or shown in the accompanying drawing shall be interpreted as illustrative and not in a limiting sense.

I claim as my invention:

1. In a self-saturating magnetic amplifier adapted to be connected to a source of alternating supply voltage to effect an output voltage across a load, the combination comprising, magnetic core means, load winding means disposed in inductive relationship with the magnetic core means, a self-saturating rectifier connected in series circuit relationship with the load winding means, circuit means including said load for effecting a flow of load current from said source through the series connected load winding means and self-saturating rectifier when said source is of one polarity and for effecting a flow of leakage current through said series circuit in the reverse direction when said source is of the opposite polarity, control winding means disposed in inductive relationship with the magnetic core means, another series circuit including compensating winding means disposed in inductive relationship with the magnetic core means, a compensating device which has substantially the same impedance-temperature characteristic as the self-saturating rectifier, and blocking means, and other circuit means for connecting said another series circuit in parallel circuit relationship with the series circuit including the load winding means and the self-saturating rectifier, the compensating winding means being so disposed that when said source is of said opposite polarity the magnetomotive force produced by the leakage current through the compensating winding means opposes the magnetomotive force produced by the leakage current through the load winding means, and said blocking means being so connected as to prevent the flow of current through said another series circuit when said source is of said one polarity.

2. In a self-saturating magnetic amplifier adapted to be connected to a source of alternating supply voltage to effect an output voltage across a load, the combination comprising, magnetic core means, load winding means disposed in inductive relationship with the magnetic core means, a self-saturating rectifier connected in series circuit relationship with the load winding means, circuit means including said load for effecting a flow of load current from said source through the series connected load winding means and self-saturating rectifier when said source is of one polarity and for effecting a flow of leakage current through said series circuit in the reverse direction when said source is of the opposite polarity, control winding means disposed in inductive relationship with the magnetic core means, another series circuit connected in parallel circuit relationship with the series circuit including the load winding means and the self-saturating rectifier, said another series circuit including a compensating rectifier which passes leakage current and which is poled in the same direction as the self-saturating rectifier relative to said source, compensating winding means so disposed in inductive relationship with the magnetic core means that when said source is of said opposite polarity the leakage current through the compensating winding means produces a magnetomotive force which opposes the magnetomotive force produced by the leakage current through the load winding means, and blocking means connected to prevent the flow of current through said another series circuit when said source is of said one polarity.

3. In a self-saturating magnetic amplifier adapted to be connected to a source of alternating supply voltage to effect an output voltage across a load, the combination comprising, magnetic core means, load winding means disposed in inductive relationship with the magnetic core means, a self-saturating rectifier connected in series circuit relationship with the load winding means, circuit means including said load for effecting a flow of load current from said source through the series connected load winding means and self-saturating rectifier when said source is of one polarity and for effecting a flow of leakage current through said series circuit in the reverse direction when said source is of the opposite polarity, control winding means disposed in inductive relationship with the magnetic core means, another series circuit connected in parallel circuit relationship with the series circuit including the load winding means and the self-saturating rectifier, said another series circuit including a compensating rectifier which passes leakage current and which is poled in the same direction as the self-saturating rectifier relative to said source, compensating winding means so disposed in inductive relationship with the magnetic core means that when said source is of said opposite polarity the leakage current through the compensating winding means produces a magnetomotive force which opposes the magnetomotive force produced by the leakage current through the load winding means, and a blocking rectifier poled to prevent the flow of current through said another series circuit when said source is of said one polarity.

4. In a self-saturating magnetic amplifier adapted to be connected to a source of alternating supply voltage to effect an output voltage across a load, the combination comprising, magnetic core means, load winding means disposed in inductive relationship with the magnetic core means, a self-saturating rectifier connected in series circuit relationship with the load winding means, circuit means including said load for effecting a flow of load current from said source through the series connected load winding means and self-saturating rectifier when said source is of one polarity and for effecting a flow of leakage current through said series circuit in the reverse direction when said source is of the opposite polarity, control winding means disposed in inductive relationship with the magnetic core means, another series circuit connected in parallel circuit relationship with the series circuit including the load winding means and the self-saturating rectifier, said another series circuit including a compensating rectifier which passes leakage current and which is poled in the same direction as the self-saturating rectifier relative to said source, compensating winding means so disposed in inductive relationship with the magnetic core means that when said source is of said opposite polarity the leakage current through the compensating winding means produces a magnetomotive force which opposes the magnetomotive force produced by the leakage current through the load winding means, and a blocking rectifier poled to prevent the flow of current through said another series circuit when said source is of said one polarity, and an impedance member connected in parallel circuit relationship with said blocking rectifier.

No references cited.